June 6, 1961 C. O. ERNOLF ET AL 2,986,765

SUCTION CLEANER

Filed Dec. 17, 1957 6 Sheets-Sheet 1

INVENTORS
Carl Oskar Ernolf
Carl Eric Sixten Andersson-Sun
BY Edmund A Fernandez
their ATTORNEY June 6, 1961 C. O. ERNOLF ET AL 2,986,765

SUCTION CLEANER

Filed Dec. 17, 1957 6 Sheets-Sheet 2

INVENTORS
Carl Oskar Ernolf
Eric Sixten Andersson-Sanu
BY Edmund A. Fenander
their ATTORNEY INVENTORS
Carl Oskar Ernolf
Carl Eric BY Gustav Andersson-Sasa
Edmund A. Fenander
their ATTORNEY June 6, 1961 C. O. ERNOLF ET AL 2,986,765

SUCTION CLEANER

Filed Dec. 17, 1957 6 Sheets-Sheet 4

INVENTORS
Carl Oskar Ernolf
Carl Eric Sixten Andersson
BY Edmund A. Fander
their ATTORNEY INVENTORS
Carl Oskar Ernolf
Carl Eric BY Sixten Andersson - Sam
Edmund A Fernandez
their ATTORNEY June 6, 1961 C. O. ERNOLF ET AL 2,986,765

SUCTION CLEANER

Filed Dec. 17, 1957 6 Sheets-Sheet 6

INVENTORS
Carl Oskar Ernolf
Carl Erik Sixten Andersson-Saam
BY Edmund A. Fenander
their ATTORNEY United States Patent Office 2,986,765

Patented June 6, 1961

2,986,765

SUCTION CLEANER

Carl Oskar Ernolf, Stockholm, and Carl Erik Sixten Andersson-Sason, Solna, Sweden, assignors to Aktiebolaget Electrolux, Stockholm, Sweden, a corporation of Sweden Filed Dec. 17, 1957, Ser. No. 703,413
6 Claims. (Cl. 15—329)

This invention relates to improvements in suction cleaners.

To be commercially acceptable, a suction cleaner should be characterized by several attributes. It should, of course, be so designed and constructed as to be readily salable and at the same time be economical and efficient in operation and durable over an extended period of use. It is also most desirable that the cleaner be light in weight and mobile in use so as to be easily operable by the housewife without fatigue. Storage is sometimes a problem, and, therefore, compactness of the cleaner is another desirable attribute. Every cleaner occasionally needs repair, and, accordingly, it is advantageous that it be so constructed as to permit ready access to its operating elements for replacement or repair as the case may be.

It is, accordingly, among the objects of this invention to provide a suction cleaner characterized by the aforesaid attributes. Other objects will in part be apparent and in part pointed out hereinafter.

In the drawings, wherein there is shown one embodiment of the invention:

Figures 1, 2:
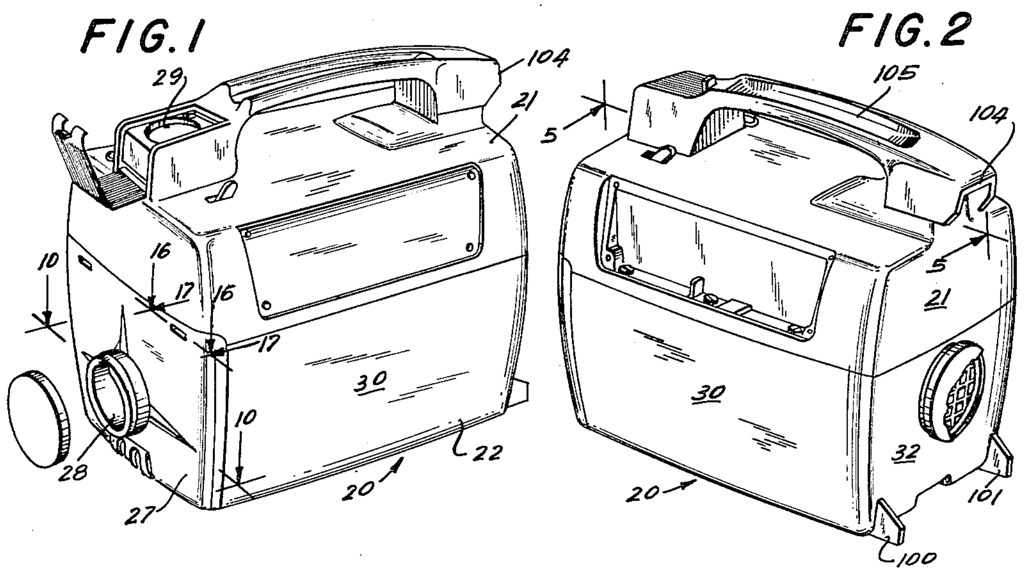
FIG. 1 is a perspective view of the cleaner showing the air inlet and exhaust ports at one end thereof.
FIG. 2 is a perspective view showing the other end of the cleaner with the removable cap, partially broken away, covering another part adapted to be uncovered when the cleaner is used as a blower.
Figure 3:
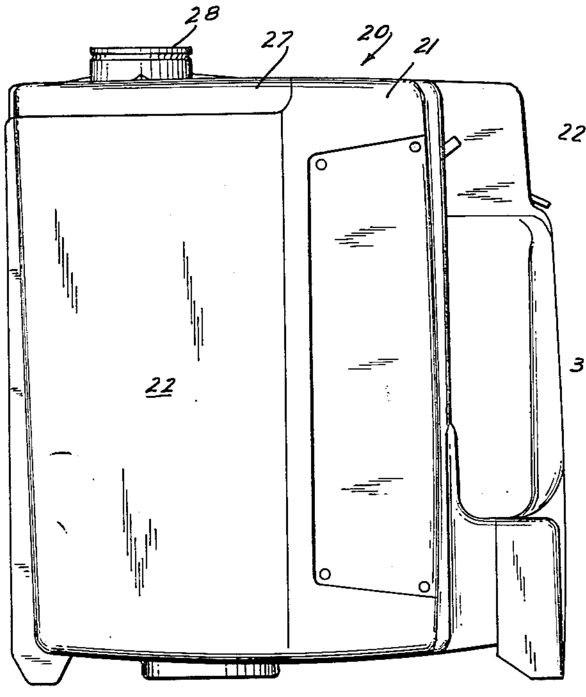
FIG. 3 is an enlarged elevation of one side of the cleaner standing on end.
Figures 5, 5A:
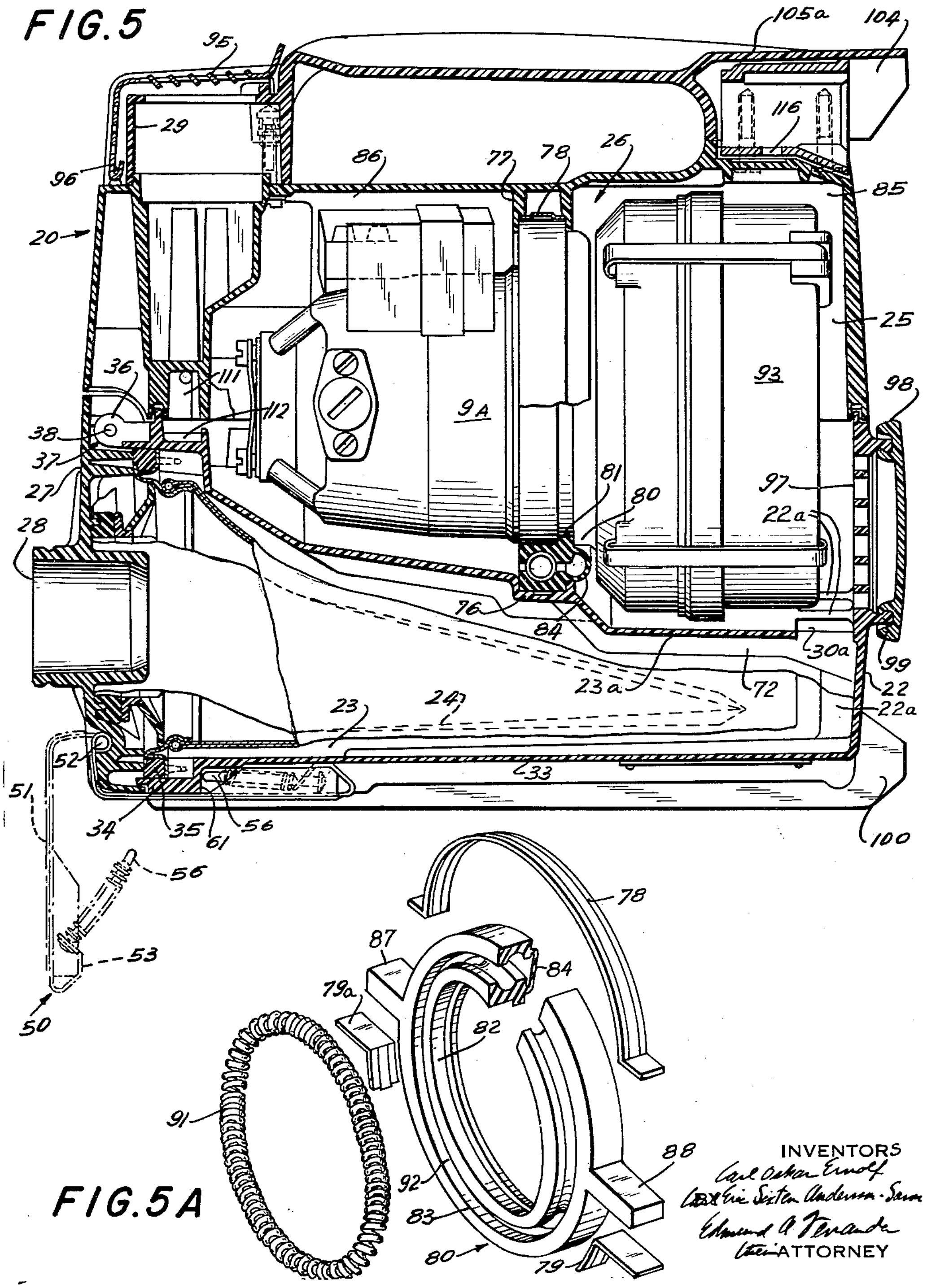
FIG. 5 is an enlarged sectional elevation taken along the line 5—5 of Fig. 2.
Figures 6, 7, 8:
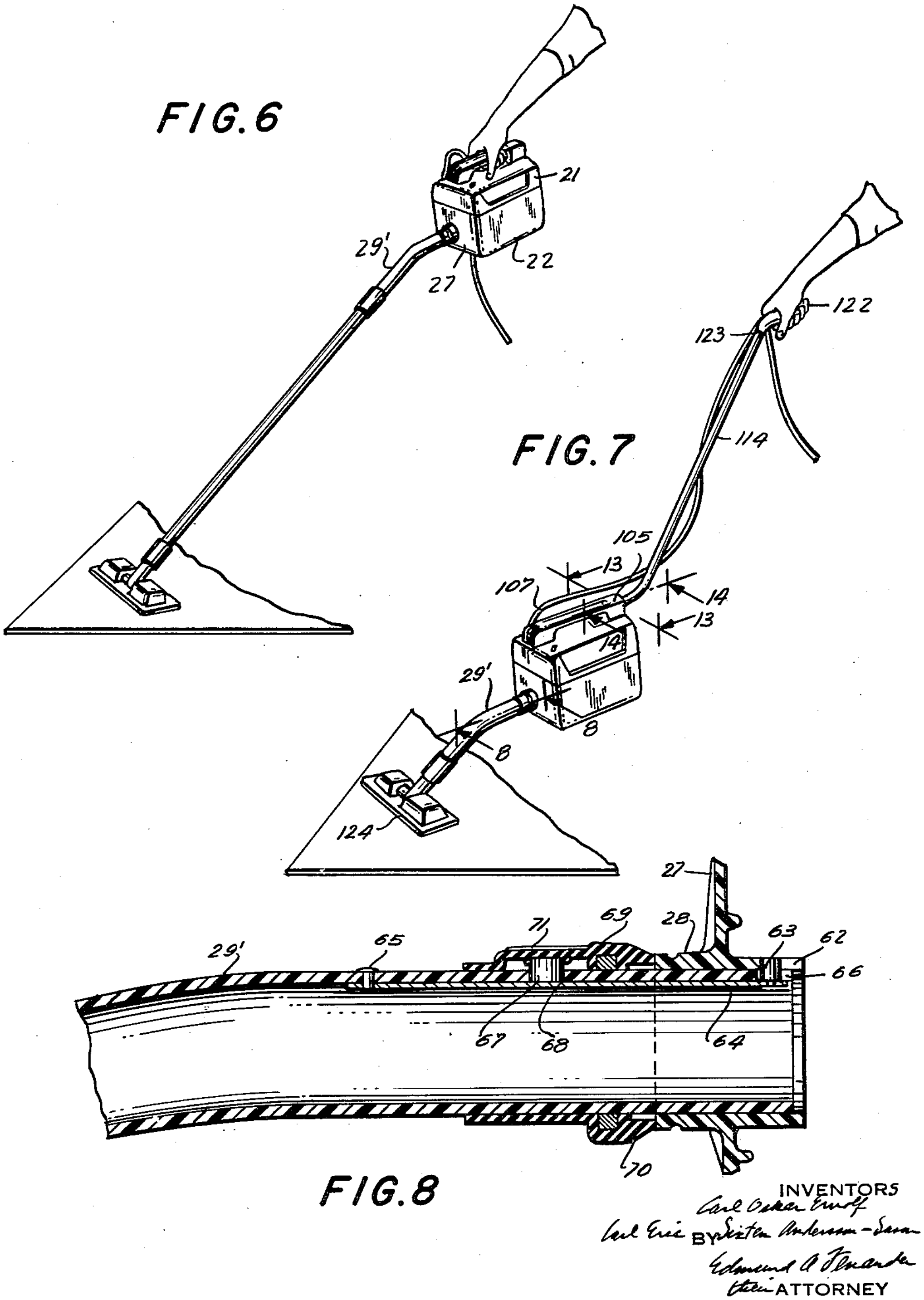
Figure 9:
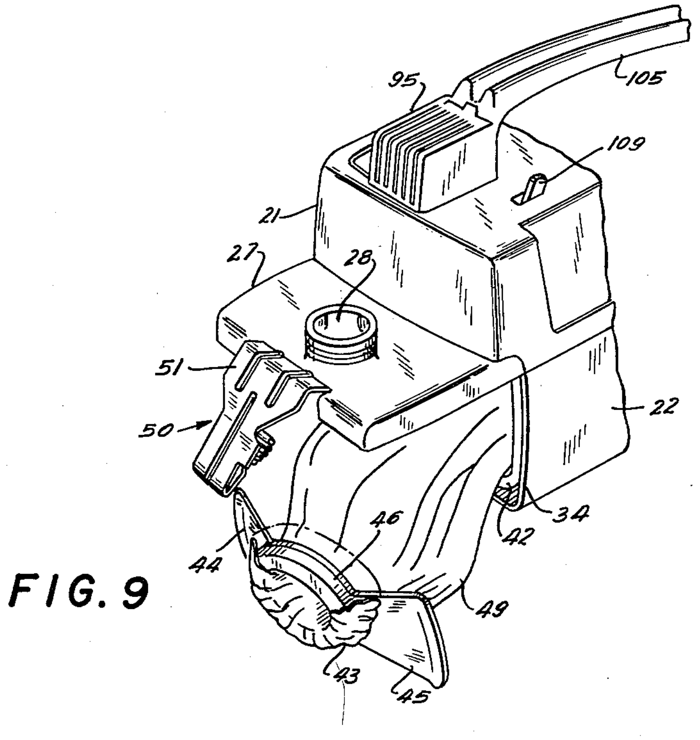
Figure 10:
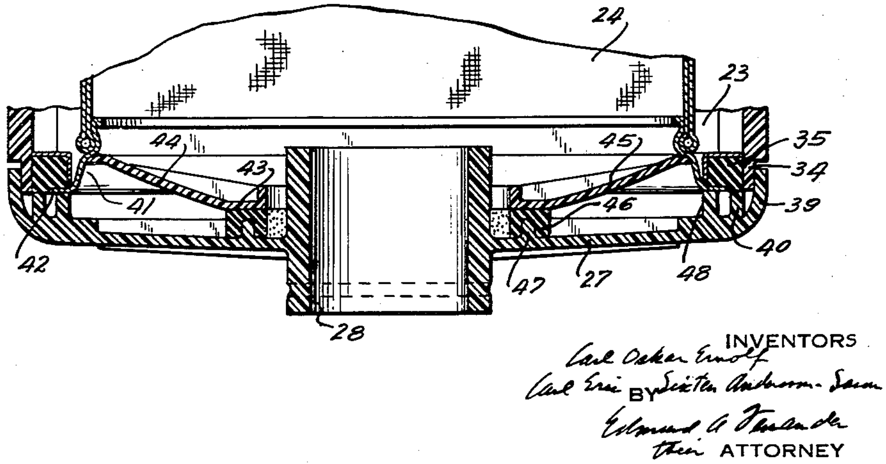
Figures 11, 12, 13, 14:
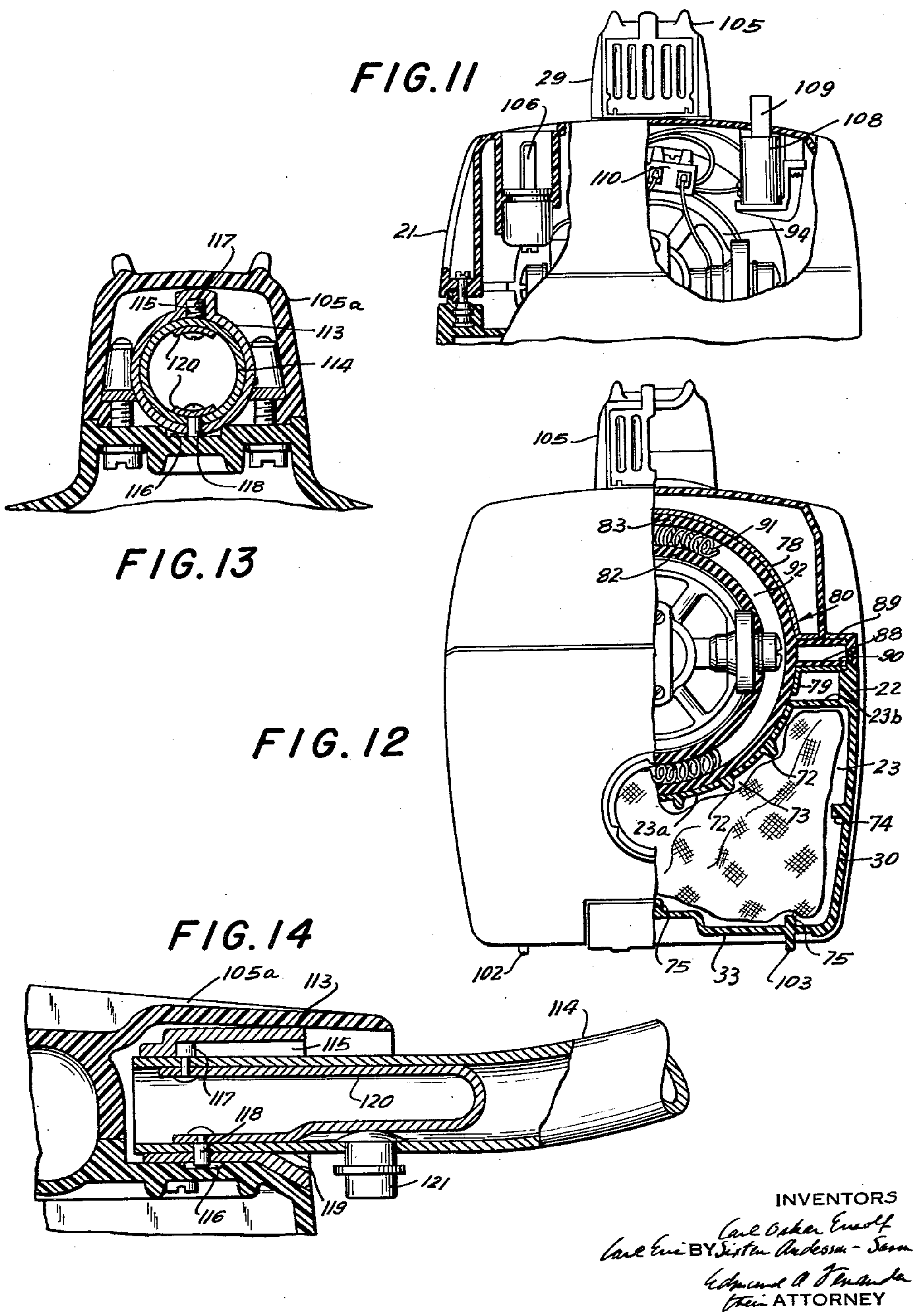
Figure 15:
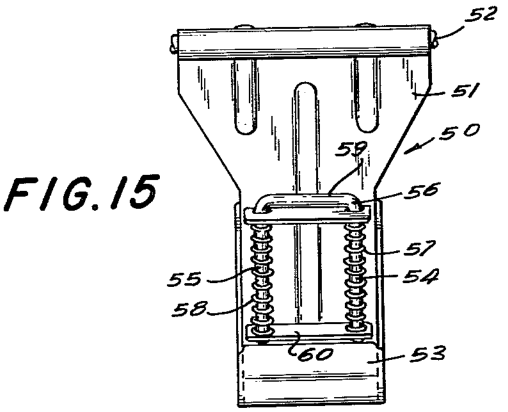
Figure 16:
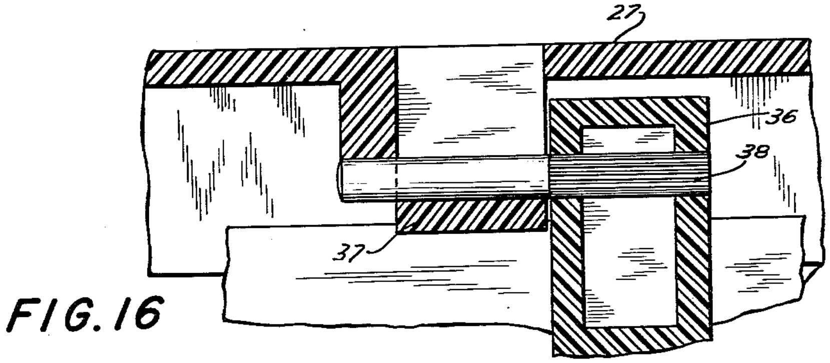
Figure 17:
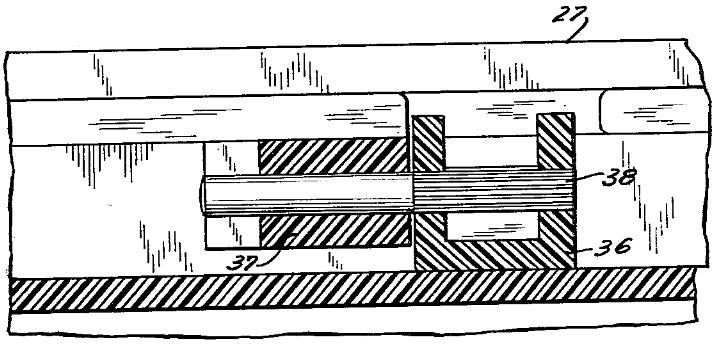

FIG. 5*a* is an exploded perspective view of the motor mounting members;

FIG. 6 is a perspective view, on a reduced scale, of the cleaner rigged with attachments for one type of manual operation;

FIG. 7 is a view similar to FIG. 6 but showing the cleaner differently rigged;

FIG. 8 is an enlarged sectional elevation taken along the line 8—8 of FIG. 7;

FIG. 9 is a fragmentary perspective view of the cleaner showing the closure for the dust bag chamber swung open and the dust bag partially removed;

FIG. 10 is an enlarged horizontal section taken along the line 10—10 of FIG. 1;

FIG. 11 is a fragmentary view, partially in section, of the upper portion of the front of the cleaner with portions of the casing broken away;

FIG. 12 is a front elevation of the cleaner, partially in section, with the casing partially broken away to show details of the motor mount;

FIG. 13 is an enlarged fragmentary sectional elevation taken along the line 14—14 of FIG. 7;

FIG. 15 is an enlarged bottom plan view of the latch and spring which hold the dust bag chamber cover closed;

FIG. 16 is an enlarged fragmentary horizontal section taken along the line 16—16 of FIG. 1; and FIG. 17 is an enlarged fragmentary vertical section taken along the line 17—17 of FIG. 1.

Similar reference characters refer to similar parts throughout the several views of the drawing.

Referring now to FIGS. 1, 2 and 5, it may be seen that the cleaner includes a housing, generally indicated at 20, which comprises upper and lower casings 21 and 22. In the lower portion of casing 22 is a dust bag chamber 23 in which a dust bag 24 is removably disposed; the upper portion of casing 22 and upper casing 21 in turn form another chamber 25 in which a motor-fan unit, generally indicated at 26, is removably mounted.

A closure or cover 27 for dust bag chamber 23 is hingedly attached to the upper front portion of casing 22 and is provided with an air inlet 28 to which a wand 29' (FIG. 6) may be detachably secured. At the upper front end of upper casing 21 (FIG. 5) we have provided an air exhaust 29 communicating with motor-fan chamber 25 which in turn communicates with dust bag chamber 23 by way of a port **30*a* formed in the upper partition 23*a* thereof. The port 30*a* is of semi-circular form and extends from the top edge 23*b* at one side of partition 23*a*, as indicated in FIG. 12, to the opposing top edge thereof at the same height as the region 23*b*. Hence, the port 30*a* extends across a major portion of the distance between the sides 30 and 31 of the housing or casing 20**.

It may now be seen that when the cleaner is in operation, dust laden air is drawn into dust bag 24 through inlet 28, the filtered air is drawn through port **30*a* into chamber 25 and is exhausted therefrom through exhaust 29 after flowing past the motor-fan unit 26** to cool the motor.

Figure 4:
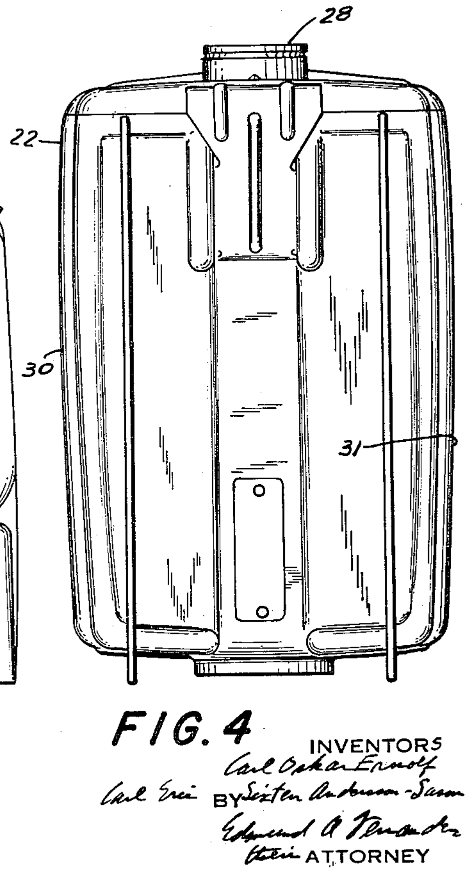
FIG. 4 is an enlarged elevation of the bottom of the cleaner as it stands on end.

Lower casing 22, which is preferably molded from a suitable plastic so as to be light in weight yet rigid, strong and durable, includes side walls 30 and 31 (FIGS. 1 and 4), a rear wall 32 (FIG. 2), a bottom wall 33 (FIG. 5), partition **23*a* and a front rim or flange 34 within which is mounted a sealing gasket 35. From the top of flange 34 extend a pair of hinge elements 36 which mate with a pair of hinge elements 37 on cover 27, through which elements extend hinge pins 38 which hingedly connect cover 27 to lower casing 22** (see also FIGS. 16 and 17).

As best shown in FIGS. 5 and 10, cover 27, which is also preferably molded from a suitable plastic, includes outer and inner flanges 39 and 40; the outer flange embracing casing rim 34 when the cover is closed, and the inner flange pressing against gasket 35 so as to seal the open end of the dust bag chamber 23. Dust bag 24 includes a rim 41 provided with an annular lip 42, which lip rests against gasket 35 when the dust bag is installed in its chamber. We also preferably provide a resilient bridge-like member 43 having oppositely extending wings 44 and 45, the extremities of which rest against a portion of dust bag rim 41 when cover 27 is closed. This bridge also has secured thereto a resilient sealing gasket 46 in which a ring 47 on the inner side of cover 27 is embedded when the cover is closed. It may now be seen that through the provision of gaskets 35 and 47, an effective seal is provided and also by virtue of the resiliency of bridge 43, dust bag 24 is firmly held in proper position with its rim lip 42 tightly pressed against gasket 35. It should further be added that cover 27 also includes another inwardly projecting ring 48 which, when the cover is closed, forces rim lip 42 tightly against gasket 35.

The cleaner, by virtue of the provision of bridge 43, may also be used with a paper dust dag. As shown in FIG. 9, a paper dust bag 49 has its mouth extending through the opening in bridge 43 with the lip of the mouth folded over gasket 46. Thus, when the paper bag is completely installed inside of the cloth bag, the extremities of bridge wings 44 and 45 rest against lip 42 of the cloth bag and ring 47 (FIG. 10) bears against the folded-over lip of the paper bag so as to hold the paper bag firmly in proper operative position.

In order to lock cover 27 in closed position, we have provided a latch device as shown in FIGS. 5, 9 and 15. This latch, which is generally indicated at 50, includes a plate 51 which is hingedly connected as by a pin 52, to the lower portion of cover 27. The other end of plate 51 is bent back on itself to provide a flange 53, in the extremity of which are slideably secured the legs 54 and 55 of a U-shaped bracket 56. A pair of coiled springs 57 and 58 embrace the bracket legs and are disposed between bars 59 and 60 through the ends of which the bracket legs extend. Thus, the two springs bias bracket 56 upwardly, as viewed in FIG. 15. As shown in FIG. 5, bottom 33 of lower casing 22 is provided with a ledge 61 against which the closed end of bracket 56 is pressed by the springs when the latch is swung to the closed position, this being the solid line position. Thus, cover 27 is securely locked in place.

As shown in FIG. 8, air inlet 28 on cover 27 is provided with a slot 62 provided to releasaby receive a locking pin 63, the inner end of which is fastened to a leaf spring 64 riveted to the inner side of wand 29′, as by a rivet 65. It should be noted that locking pin 63 extends through a slot 66 at the inner rim of the wand and accordingly the locking pin 63 is constantly biased toward locking position. A releasing pin 67 is slidable through a hole 68 formed in the wand, and the outer end of this pin bears against the under side of a resilient member 69 which embraces the wand and is secured thereto in any suitable manner. This member 69 may be formed of rubber and at its right-hand end (as shown in FIG. 8) has a gasket-like portion 70 which seals against the outer end of inlet 28 when the wand is locked in place. Member 69 also includes a thumb piece 71 and it is against the under side of this thumb piece that the outer end of pin 67 bears. Thus, when it is desired to release, or rather disconnect, the wand from cover 27, thumb piece 71 may be depressed, thus flexing spring 64 downwardly to retract pin 63 from slot 62 enabling withdrawal of the wand.

As shown in FIGS. 5 and 12, the walls, top and bottom of lower casing 22 are provided with a plurality of inwardly extending ribs which, when the dust bag is inflated, bear against the outer surface of the dust bag so as to prevent the dust bag from being pressed tightly against the inner surface of the chamber which would preclude passage of filtered air therethrough. More specifically, partition 23*a* (FIG. 12) is provided with spaced, downwardly extending ribs 72, the gaps between adjacent ribs forming channels 73 through which filtered air may flow when the cleaner is in operation. These ribs thus prevent engagement between the surface of the dust bag and the inner surface of partition 23*a*. Similarly, the inner walls of chamber 23 are provided with ribs 74, the rear end wall 22 is provided with ribs 22*a*, and the bottom of the chamber is provided with ribs such as ribs 75, these ribs acting in the same manner as ribs 72. Accordingly, as pointed out above, with the machine in operation and the dust bag inflated, the several ribs provide adequate air flow channels which permit flow of filtered air through the rear of chamber 23 (see FIG. 5) from which the air may flow through elongated part 30*a* into upper casing 21. Further, the top portion of the vertical ribs 22*a* at the rear end 22 of the casing 20 bridge the gap between the rear end of the intermediate horizontally disposed wall 23*a* and the rear end 22 of the casing, as best seen in FIG. 5.

As shown in FIG. 5, partition 23*a* slopes downwardly from the front to the rear of the cleaner, and, accordingly, dust bag chamber 23 is somewhat wedge-like in form. In the upper central part of the partition there is provided a circular seat 76, a similar seat 77 being provided in upper casing 21. It is in these two seats that the motor-fan unit 26 is supported by means of two sheet metal straps 78, 79 and 79*a* (see FIG. 5*a*) and a sound dampening suspension member generally indicated at 80.

Suspension member 80 is held to motor-fan unit 26 by a projection 81 of the housing of the motor. Suspension member 80 consists of two soft concentric annular rings 82 and 83 (FIGS. 5*a* and 12) which are preferably made of rubber and are held together by a thin wall or diaphragm 84 integral with them, whereby the suspension member 80 forms a seal between the suction space 85 on the right of the motor-fan unit, as viewed in FIG. 5, and an exhaust space 86 in which the lefthand side of the motor-fan unit is disposed. On the outer annular part 83 of the suspension member there are formed, as shown in FIG. 5*a*, radially extending arms 87 and 88 which are supported by supporting surfaces 89 and 90 formed at the edges of the upper and lower casings 21 and 22 (see FIG. 12), these arms preventing the suspension member 80 from turning in the seats 76 and 77. In order to strength the vibration dampening action of suspension member 80, an annular helical spring 91 is disposed in a pocket 92 of circular cross-section between rings 82 and 83. The suspension member 80, consisting of rings 82 and 83, diaphragm 84 and arms 87 and 88, forms a so-called single plane suspension, and the projection 81 of the motor-fan unit, against which suspension member 80 rests, is placed in the vertical plane passing through the center of gravity of the motor-fan unit at right angles to the rotary part. Thus it may be seen that the motor-fan unit is resiliently mounted between upper and lower casings 21 and 22 and may readily be removed for repair or replacement merely by disconnecting the upper and lower casings and the wiring between the motor-fan unit and the switch. Thus, when the cleaner is in operation, filtered air flows into space 85 through a fan and filter unit 93, thence through the casing of motor 94 and the space 86 and out through exhaust or outlet 29.

Outlet 29 is perferably provided with an L-shaped grating 95 hinged to upper casing 21, as at 96, so as to be swingable toward and away from outlet 29. The grating is preferably swung to closed position when outlet 29 is not used for connecting an accessory which operates by air flow. The grating 95 is also swung to closed position when the cleaner is stood on its end for use as a hair dryer.

In order to adapt the cleaner for use as a hair dryer, a second inlet 97 (FIG. 5) is provided in the rear wall of lower casing 22. A cap 98 may be detachably secured over inlet 97, as by lugs 99, when the cleaner is used as a cleaner. When it is desired to use the cleaner as a hair dryer, this cap 98 is removed from over inlet 97 and is installed over inlet 28, thus clean air may flow through inlet 97 through the motor-fan unit into space 86 and out through outlet 29. Preferably, a pair of legs 100 and 101 are provided in the rear ends of upper and lower casings 21 and 22 so that the cleaner may be stood on end, making it more convenient for use as a hair dryer.

As shown in FIG. 12, the bottom 33 of lower casing 30 is provided with a pair of runners 102 and 103 which form a support for the cleaner when it is placed, for instance, on a table while being used as a hair dryer or when pulled around the floor during vacuum cleaning by means of a suction hose (not shown) connected to the inlet 28. These runners extend out behind the cleaner and are integral with legs 100 and 101 (see FIG. 2). Thus, the cleaner may be tilted backward into a position in which the axis of the motor-fan unit is vertical and the cleaner rests on legs 100 and 101 and on a support 104 formed by a backward extension of a carrying handle 105 which is integral with and extends upwardly from the top of upper casing 21. Furthermore, placing the cleaner in this position facilitates removal of the dust bag. On the top of upper casing 21 (FIG. 11) there is counter-sunk on one side of outlet 29 a plug 106 for connecting the current feed cable 107 (FIG. 7), while on the other side of the outlet (see FIG. 11) there is arranged a switch 108, the operating member 109 of which extends through a hole in the top of casing 21 alongside the front end of handle 105. Switch 108 and plug 106 are connected by conventional wiring to a terminal board 110 mounted on the front of motor 94, from which wires extend to the motor brushes and stator winding as well as to the usual anti-static TV, anti-interference, etc., capacitors. Preferably, the faces of the upper and lower casings 21 and 22, which face each other, are provided below the outlet 29 with channels 111 and 112 in which the motor cables are laid (motor cables not shown).

As shown in FIGS. 5, 13 and 14, the rear portion 105*a* of handle 105 is molded to form a sleeve-like locking device 113 which is adapted to receive a maneuvering shaft 114 for the cleaner when it is used in the manner illustrated in FIG. 7. Locking sleeve 113 (FIG. 14) is provided with a longitudinal guide groove 115 and a recess 116 (FIG. 5) consisting of a radially drilled hole. Into the guide groove 115 a pin 117 engages upon the fastening of maneuvering handle 114 to the cleaner while the pin 118 extends down into recess 116. In order that pin 118 may be more easily inserted into its locking position, the rear part of the upper casing is provided with an oblique surface 119 on which the pin slides upward under radial pressure on the maneuvering shaft and upon the insertion thereof into locking sleve 113. Pins 117 and 118 are secured to the ends of a hairpin-shaped leaf spring 120 which biases the pin in opposite directions. Thus, when it is desired to attach maneuvering handle 114 to locking sleeve 113, the end of the handle is oriented so that pin 117 enters groove 115 and pin 118 engages surface 119. Then, by exerting pressure on the handle, pin 117 slides along the groove 115 and pin 118 slides up surface 119 and into locking sleeve 113 until pin 118 is sprung into recess 116, thereby locking the maneuvering handle in proper position. A releasing button 121 extends through a hole in the bottom of maneuvering handle 114 and its inner end bears against the lower leg of leaf spring 120. Thus, when it is desired to disattach handle 114, button 121 is pressed upwardly to withdraw pin 118 from recess 116, whereupon the handle may be readily withdrawn from the locking device.

As shown in FIG. 7, we have provided a hand grip 122, preferably formed of rubber or plastic, this handle grip being so molded as to include a hook 123 on which cable 114 may be suspended and thus held out of the path of the nozzle 124 and the user's feet during operation of the cleaner.

As can be seen from a consideration of FIGS. 6 and 7, an imaginary line connecting handle 105 and hand grip 122, respectively, with nozzle 124 will pass through upper casing 21 of the cleaner; indeed, more specifically through motor 94 (FIG. 5) near its center of gravity. Thus, the guiding of nozzle 124 over the floor is considerably facilitated by the "tilting" of the cleaner.

Although we have illustrated and described particular embodiments of our invention, we do not desire to be limited to the particular arrangement set forth and we intend in the following claims to cover all modifications which do not depart from the spirit and scope of our invention.

What is claimed is:

1. In a compact lightweight portable suction cleaner which is adapted to be held when in use and having a substantially box-like casing provided with an air inlet and outlet and a dust bag therein for removing dust from air circulated therethrough by a motor-fan unit, the opposite ends of said casing forming the front and rear ends of the cleaner, said casing having a generally rectangular-shaped bottom, a four-sided upstanding wall, a generally rectangular-shaped top and an intermediate horizontally disposed wall between the top and bottom to form top and bottom compartments, the upstanding wall including opposing sides joining the front and rear ends of said casing, the air inlet and outlet being in communication with the bottom and top compartments, respectively, at the front end of said casing, said intermediate horizontally disposed wall being generally inclined to the top and bottom and sloping downwardly from the front to the rear end of said casing and having an opening at the rear end of said casing, said dust bag being disposed in the bottom compartment to receive air drawn through the inlet and extending toward the rear end of said casing, said casing having a removable cover which includes the top wall, the motor-fan unit being disposed in the top compartment with the motor and fan at the front and rear parts, respectively, of said casing, and with the fan having its inlet facing the rear end of said casing, the overall height of the top and bottom compartments being essentially the same at the front and rear ends of said casing, the height of the top compartment at the rear end of said casing being at least two-thirds of the overall height of both compartments and the height of the bottom compartment at the front end of said casing being at least one-third greater than the height thereof at the rear end of said casing, the opening in said horizontally disposed wall extending across a major portion of said casing between the opposing sides thereof, the rear end of said casing having an opening at the vicinity of the opening in said intermediate horizontally disposed wall, and closure means for closing the last-mentioned opening.

2. Apparatus as set forth in claim 1 comprising means including said closure means for closing the air inlet at the front end of said casing.

3. Apparatus as set forth in claim 1 in which at least a part of the opening in the rear end of said casing is disposed above the bottom of the fan of said motor-fan unit and is directly opposite the air inlet end thereof.

4. In a suction cleaner adapted to be manually manipulated by a member and having a casing provided with an air inlet and outlet and a dust bag therein for removing dust from air circulated therethrough by a motor-fan unit, the opposite ends of said casing forming the front and rear ends of the cleaner, said casing having a bottom, an upstanding wall, a top and an intermediate horizontally disposed wall between the top and bottom to form top and bottom compartments, the air inlet and outlet being in communication with the bottom and top compartments, respectively, at the front end of said casing, said intermediate wall having an opening at the rear end of said casing, said dust bag being disposed in the bottom compartment to receive air drawn through the inlet and extending toward the rear end of said casing, said casing having a removable cover which includes the top wall, the motor-fan unit being disposed in the top compartment with the motor and fan at the front and rear parts, respectively, of said casing, and with the fan having its inlet facing the rear end of said casing, said cover including the top and part of the upstanding side wall between the top and said intermediate horizontally disposed wall, means including said removable cover for clamping said motor-fan unit against the top face of said intermediate horizontally disposed wall, said motor-fan unit nesting within said cover when it is clamped against the top face of said intermediate horizontally disposed wall, and said top, at the rear end of said casing at a region adjacent the fan, including means providing a detachable connetcion for the member which is adapted to project in a direction from the rear end of said casing.

5. Apparatus as set forth in claim 4 in which the top of said casing includes a carrying handle having a hand grip spaced from the top and extending from the front to the rear end of said casing, said detachable connection means being formed at the rear end of said handle.

6. In a suction cleaner having a casing provided with an air inlet and outlet and a dust bag therein for removing dust from air circulated therethrough by a motor-fan unit, the opposite ends of said casing forming the front and rear ends of the cleaner, said casing having a bottom, an upstanding wall, a top and an intermediate horizontally disposed wall between the top and bottom to form top and bottom compartments, the upstanding wall including opposing sides joining the front and rear ends of said casing, the air inlet and outlet being in communication with the bottom and top compartments, respectively, at the front end of said casing, said intermediate wall having an opening at the rear end of said casing, said dust bag being disposed in the bottom compartment to receive air drawn through the inlet and extending toward the rear end of said casing, said casing having a removable cover which includes the top wall, the motor-fan unit being disposed in the top compartment with the motor and fan at the front and rear parts, respectively, of said casing, and with the fan having its inlet facing the rear end of said casing, the opening in said horizontally disposed wall extending across a major portion of said casing between the opposing sides thereof, the rear end of said casing having an opening at the vicinity of the opening in said intermediate horizontally disposed wall, at least a part of the opening in the rear end of said casing being disposed above the bottom of the fan of said motor-fan unit and directly opposite the air inlet end thereof, closure means for closing the opening at the rear end of said casing, and means including the rear end of said casing for supporting the latter in an upright position on a supporting surface with the rear end serving as a supporting base for the cleaner and the opening in the rear end spaced from the surface.

References Cited in the file of this patent

UNITED STATES PATENTS

| | | |
|---|---|---|
| 1,156,235 | Kirby | Oct. 12, 1915 |
| 2,419,490 | Fraser | Apr. 22, 1947 |
| 2,500,832 | Kirby | Mar. 14, 1950 |
| 2,507,672 | McAllister | May 16, 1950 |
| 2,534,578 | Crabb | Dec. 19, 1950 |
| 2,632,524 | Senne | Mar. 24, 1953 |
| 2,699,838 | Holm-Hansen | Jan. 18, 1955 |
| 2,729,303 | McMahan | Jan. 3, 1956 |
| 2,758,669 | Brace | Aug. 14, 1956 |

FOREIGN PATENTS

| | | |
|---|---|---|
| 118,114 | Sweden | Feb. 11, 1947 |
| 246,238 | Switzerland | Sept. 1, 1947 |
| 711,039 | France | June 16, 1931 |
| 882,711 | France | Mar. 8, 1943 |